(12) United States Patent
Krishnamurthy et al.

(10) Patent No.: US 12,086,489 B2
(45) Date of Patent: Sep. 10, 2024

(54) METHODS AND SYSTEMS FOR MANAGING MULTIPLE PRIORITY JOBS AT A MULTI-FUNCTION DEVICE

(71) Applicant: XEROX CORPORATION, Norwalk, CT (US)

(72) Inventors: Janani Krishnamurthy, Chennai (IN); Surya Priyadharshini Selvam, Chennai (IN); Sridhar Ananthanarayanan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/892,197

(22) Filed: Aug. 22, 2022

(65) Prior Publication Data

US 2024/0061630 A1 Feb. 22, 2024

(51) Int. Cl.
G06F 3/12 (2006.01)

(52) U.S. Cl.
CPC .......... *G06F 3/1263* (2013.01); *G06F 3/1207* (2013.01); *G06F 3/1212* (2013.01)

(58) Field of Classification Search
CPC ..... G06F 3/1207; G06F 3/1263; G06F 3/1212
See application file for complete search history.

(56) References Cited

U.S. PATENT DOCUMENTS

| | | | |
|---|---|---|---|
| 5,832,301 | A | 11/1998 | Yamaguchi |
| 7,216,347 | B1 | 5/2007 | Harrison et al. |
| 10,082,994 | B1 * | 9/2018 | Ruiz .................. H04N 1/00244 |
| 10,180,816 | B1 * | 1/2019 | Soundararajan ... H04N 1/00037 |
| 10,198,224 | B1 | 2/2019 | Ferrel et al. |
| 10,545,796 | B2 | 1/2020 | Bahramshahry et al. |
| 2020/0310724 | A1 * | 10/2020 | Aher .................... G06F 3/1289 |

FOREIGN PATENT DOCUMENTS

JP 4217152 B2 1/2009

* cited by examiner

*Primary Examiner* — John R Wallace

(57) ABSTRACT

The present disclosure discloses methods and systems for managing multiple priority jobs at a multi-function device. The method includes receiving a first job at the multi-function device, wherein the first job is to be completed within a pre-defined time. Then, a second job is received at the multi-function device. Upon receiving the second job, a pre-defined algorithm is run to determine an execution order for the first job and the second job. Based on the pre-defined algorithm, either continue executing the first job or start executing the second job. This way, multiple jobs are managed at the multi-function device.

28 Claims, 9 Drawing Sheets

| Job Details: ScanToFTP.weblet | |
|---|---|
| Job Type | Print |
| Time Submitted | Dec. 22, 2021 06:54:52 PM |
| Time Completed | Dec. 22, 2021 06:54:54 PM |
| Status | Job is paused due to an encounter of high priority job — 312 |
| Job Owner | Remote User |
| Immediate Overwrite | Successful |
| Number of Images | 0 |

| Job Details: Test_Secure_Print.pdf | |
|---|---|
| Job Type | Print |
| Time Submitted | Dec. 6, 2021 06:43:38 PM |
| Time Completed | Dec. 20, 2021 02:38:44 PM |
| Status | Low-priority job could not be completed due to encounter of High-priority Job |
| Job Owner | EIP User |
| Immediate Overwrite | Successful |
| Number of Images | 0 |

METHODS AND SYSTEMS FOR MANAGING MULTIPLE PRIORITY JOBS AT A MULTI-FUNCTION DEVICE

TECHNICAL FIELD

The presently disclosed subject matter relates to the field of printing documents and more particularly to systems and methods for managing multiple priority jobs at a multi-function device.

BACKGROUND

When a user submits a print job, it gets added to a job queue and is printed according to its position in the job queue. The print job is printed in complete without any intervention. But this may become a problem, when the job submitted by the user is large i.e., a document having hundreds of pages. For example, when the user submits a huge print job at the multi-function device having hundreds of pages, all other jobs are blocked or remains pending. i.e., other jobs are only considered for printing when the huge print job is completed. This unnecessary causes frustration among other users whose jobs are just 1 page document, 2 pages document or smaller size jobs as compared to the huge job present at the multi-function device. Moreover, if the user has some buffer time to print the huge job, there is no point making other users wait at the multi-function device. In simple words, such situations make the multi-function device unavailable for other users and their respective jobs.

Further, the huge job continues to print at the multi-function device unless there is a manual pause or stop button pressed at the multi-function device. In some cases, the huge job may be put on hold when there is a high priority job. In addition, there can be situations when the job submitted at the multi-function device may not be huge and can be printed later during the day. In this view, there is a need for methods and systems that can manage multiple priority jobs at the multi-function device.

SUMMARY

According to aspects illustrated herein, the present disclosure discloses a method for managing multiple jobs at a multi-function device. The method includes executing a first job at the multi-function device, wherein the first job is required to be completed within a pre-defined time, wherein the first job has one of: a no priority tag, a low priority tag, or a normal priority tag. Then, a second job is received at the multi-function device, wherein the second job has one of: a no priority tag, a low priority tag, a normal priority tag or a high priority tag. Upon receiving the second job, a completion time for the first job and the second job are estimated. Then, the pre-defined time for the first job is compared with the estimated completion time for the first job and the estimated completion time for the second job. Based on the comparison, either continuing executing the first job or start executing the second job. This way, multiple jobs are managed at the multi-function device.

According to further aspects illustrated herein, a multi-function device for managing multiple jobs received at the multi-function device is disclosed. The multi-function device includes a controller for: executing a first job at the multi-function device, wherein the first job is required to be completed within a pre-defined time, wherein the first job has one of: a no priority tag, a low priority tag, or a normal priority tag; receiving a second job at the multi-function device, wherein the second job has one of: a no priority tag, a low priority tag, a normal priority tag or a high priority tag; upon receiving the second job, estimating a completion time for first job and the second job; comparing the pre-defined time for the first job with the estimated completion time for the first job and the estimated completion time for the second job; and based on the comparison, continue executing the first job or start executing the second job.

According to furthermore aspects illustrated herein, a method for managing multiple priority jobs at a multi-function device is disclosed. The method includes executing a first job at the multi-function device, wherein the first job has one of: a low priority tag, a normal priority tag, or a no priority tag, and the first job is required to be completed within a pre-defined time. Then, a second job is received at the multi-function device, wherein the second job has one of: a no priority tag, a low priority tag, or a normal priority tag. Upon receiving the second job, a pre-defined algorithm is run to determine an execution order for the first job and the second job. Then, an estimated completion time for the first job and the second job are calculated. Based on this, one of the following is performed: start executing the second job if the estimated completion time for the first job and the estimated completion time for the second job is less than the pre-defined time; and continue executing the first job if the estimated completion for the first job and the estimated completion time for the second job is greater than the pre-defined time.

According to further aspects illustrated herein, a method for managing multiple priority jobs at a multi-function device is disclosed. The method includes executing a first job at the multi-function device, wherein the first job has one of: a low priority tag, a normal priority tag, or a no priority tag, and the first job is required to be completed within a pre-defined time. Then, a second job is received at the multi-function device, wherein the second job has a high priority tag. Upon receiving the second job, running a pre-defined algorithm to determine an execution order of the first job and the second job. Thereafter, an estimated completion time for the first job and the second job are calculated. Finally, one of the following is performed: start executing the second job if the estimated completion time for the first job and the estimated completion time for the second job is less than the pre-defined time; or start executing the second job if the estimated completion time for the first job and the estimated completion time for the second job is greater than the pre-defined time.

According to additional aspects illustrated herein, a system for managing multiple priority jobs is disclosed. The system includes: one or more computing devices, wherein each computing device includes a print driver application, wherein the print driver application includes an option to define a priority tag for one or more jobs to be submitted at a multi-function device, and the print driver application further includes an option that allows one or more users to define a pre-defined time for each job to be submitted at the multi-function device, wherein the one or more computing devices are for: sending a first job for printing at the multi-function device along with a pre-defined time and a priority tag, wherein the first job has one of: a no priority tag, a low priority tag, or a normal priority tag; and sending a second job for printing at the multi-function device and a priority tag, wherein the second job has one of: a no priority tag, a low priority tag, a normal priority tag or a high priority. The system further includes a multi-function device communicatively coupled to the one or more computing devices, for: executing the first job at the multi-function device, wherein the first job is required to be completed within the pre-defined time; receiving the second job at the multi-function device; upon receiving the second job, estimating a completion time for the first job and the second job; comparing the pre-defined time for the first job with the estimated completion time for the first job and the estimated completion time for the second job; and based on the comparison, continuing executing the first job or start executing the second job.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 3A-3D show various snapshots for implementing the present disclosure.

DESCRIPTION

Figure 1:
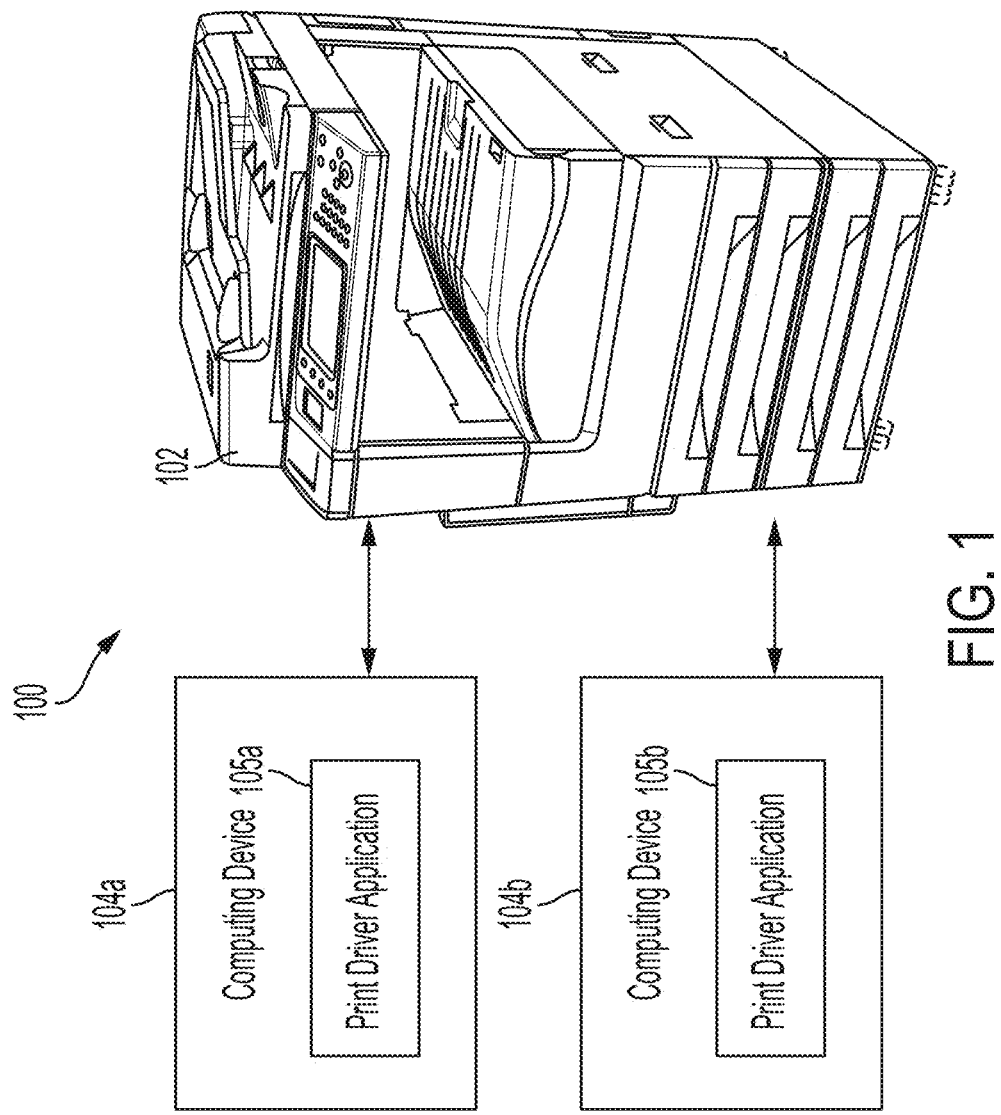
FIG. 1 shows an exemplary environment including a multi-function device in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "multi-function device" is a single device or a combination of multiple devices, to perform one or more functions such as, but not limited to, printing, imaging, scanning, and so forth. The multi-function device may include software, hardware, firmware, and combination thereof. In context of the current disclosure, the multi-function device manages multiple priority jobs received at the multi-function device. The multiple jobs are prioritized such that jobs are printed/executed based on a pre-defined algorithm which is further based on priority tag and/or based on a completion timeline/pre-defined time. For example, the multiple priority jobs are managed such that no user has to wait unnecessarily when an ongoing job has sufficient time for completion. More details will be discussed below.

The term "document" refers to any document submitted for printing, having content in the form of text, image, graphics, or a combination thereof. The document submitted for printing is in the virtual form or electronic form. The document can be submitted by any user.

The term "pre-defined algorithm" refers to few checks to be performed for jobs submitted for printing at the multi-function device. The few checks are based on at least: estimated completion time, priority tag, pre-defined time, or the like. The pre-defined algorithm is implemented such that multiple priority jobs are managed without making any user wait at the multi-function device and further prevents any confusion between multiple jobs and/or users.

The term "Estimated Time of Completion" (ETC) refers to the time estimated for completing a job at the multi-function device. The estimated time is calculated for each print job at the multi-function device. The estimated time is calculated based on one or more parameters such as number of pages in the document, number of pages already printed, number of pages to be printed, priority tag, other print jobs at the queue or the like.

The term "pre-defined time" refers to a time defined by a user by which the user wants his print job to be completed/printed at the multi-function device. The pre-defined time may be referred to as "completion timeline" or "cut-off time".

The term "user" refers to a user who submits one or more jobs at the multi-function device for printing.

The term "first job" refers to a job submitted at the multi-function device for printing. The second job refers to a print job submitted after the first job is submitted/received at the multi-function device. The first job and the second job may belong to the same user or may belong to different users.

The term "priority tag" refers to a tag defined by the user for printing his job. The priority tag can be defined for each print job at the multi-function device. The priority tag can be defined by a user submitting the job such as the first job or the second job. In some cases, the priority tag can be defined by the multi-function device in case the user does not define any priority tag. The priority can be defined based on the document type, based on the user type, based on content of the document, or a combination thereof, without limiting the scope of the disclosure.

The term "computing device" refers to a device that the user typically uses for his day-to-day work, submitting print commands and other purposes. Examples of the computing device include, but are not limited to, a personal computer, a desktop, a laptop, a mobile phone, a mobile device, a tablet, a Personal Digital Assistant (PDA), a smart-phone or any other device capable of data communication and/or print submission. The computing device includes a print driver application that allows the user to submit documents for printing, one or more print parameters, and so on. In context of the current disclosure, the print driver application includes an option that allows users: (i) to define a priority tag when submitting one or more documents for printing and (ii) a completion time/pre-defined time for completing a print job such as first print job or second print job.

Overview

The present disclosure discloses methods and systems for managing multiple priority jobs at a multi-function device. The methods and systems manage jobs such that large/huge jobs don't block other jobs at the multi-function device hence save time of users. The methods and systems automatically assign large jobs or similar jobs with a tag such as a low priority tag. The methods and systems improve turnaround time of other jobs as the scheduling of jobs get more sensible with low priority jobs being scheduled to execute after other jobs. The methods and systems can automatically set any job as low priority job.

Exemplary Environment

FIG. 1 illustrates an exemplary environment 100 in which various embodiments of the disclosure can be practiced. The environment 100 is shown to include a multi-function device 102 but the environment 100 may include a printer, a multi-function printer or any device with printing capabilities. The multi-function device 102 provides one or more functionalities such as printing, scanning, imaging, copying, or the like. In context of the current disclosure, the multi-function device 102 manages multiple priority jobs received at the multi-function device 102. In an example, multiple priority jobs can be low priority jobs, high priority jobs, or no priority job i.e., normal jobs. The multi-function device 102 may include various suitable components that are required to implement the current disclosure. As shown, the multi-function device 102 is communicatively coupled to one or more computing devices such as 104a, or 104b via communication networks as known or later developed networks. The computing device 104a includes a print driver application 105a, and the computing device 104b includes a print driver application 105b. The print driver application 105 allows the user to submit one or more documents for printing along with one or more print attributes such orientation, black&white, color, quality, destination, or the like. The computing device 104a may be used by a user such as user A, while the computing device 104b may be used by a user such as user B.

In operation, a user such as user A submits a document for printing at the multi-function device 102. While submitting the document at the multi-function device 102, the user A defines a priority tag for the document. For example, the priority tag can be a high priority tag, low priority tag or no priority tag. The priority tag can be defined based on the content of the document, type of document, based on any requirement of the user and/or organization or the like. The document submitted at the multi-function device 102 can be considered as a first job at the multi-function device 102. The document can include content in the form of text, image, graphics, or a combination thereof. The document can be in any desirable format such as MS word, PDF, JPEG, or the like. For easy discussion, it can be considered that the first job is a low priority job. While submitting the first job, the user A submits a pre-defined time by which the user wishes to complete printing his job. The first job can be a huge job or otherwise a job that does not require printing on urgent basis or immediate basis.

The user A can submit the first job via his computing device such as 104a. Alternatively, the user can submit the first job via his mobile device, cloud location, directly via the multi-function device 102. As shown, the computing device 104a includes a print driver application 105a that allows the user to submit the document for printing. While submitting the first job, the print driver application 105a includes an option for one or more priority tags such as a low priority tag, a high priority tag, a no priority tag, a regular priority tag or the like. The user A can select a priority tag based on his requirement. In context of the present disclosure, the user A selects a low priority tag for his job such as first job. Once selected, the print driver application 105a further includes an option that allows the user A to define a completion time or pre-defined time by which the user A wants to get his job printed. For example, the completion time can be 8:00 PM today, 9:00 PM today, 11:00 AM tomorrow or so on. Here, the print driver application 105a includes a text box where the user A can add completion timeline based on his requirement. This way, the user A submits the first job at the multi-function device 102 along with priority tag and pre-defined time for the first job.

Post receiving the first job at the multi-function device 102, the multi-function device 102 starts executing/printing the first job at the multi-function device 102. While executing the first job, the multi-function device 102 receives a second job. The second job may be submitted by the same user such as user A or may be submitted by a different user, for example, user B. The second job may be a high priority job, a low priority job or a no priority job. Upon receiving the second job at the multi-function device 102, the multi-function device 102 estimates completion time for the first job and the second job and determines their respective priorities. Based on the estimated completion time for the first job and the second job and their comparison with the pre-defined time, the multi-function device 102 either continues to execute the first job or starts executing the second print job. This way, the multi-function device 102 manages multiple priority jobs received at the multi-function device 102. The multi-function device 102 manages the first job and the second job such that the user of the second job does not have to unnecessarily wait for completion of the first job.

The exemplary environment 100 is shown to include a single multi-function device 102 and the computing devices 104a and 104b (collectively 104) but the environment 100 can include multiple multi-function devices and multiple computing devices communicatively coupled to the multi-function devices without limiting the scope of the disclosure. The multi-function device 102 and the computing devices 104a and 104b collectively forms a system for implementing the present disclosure.

Exemplary System

Figure 2:
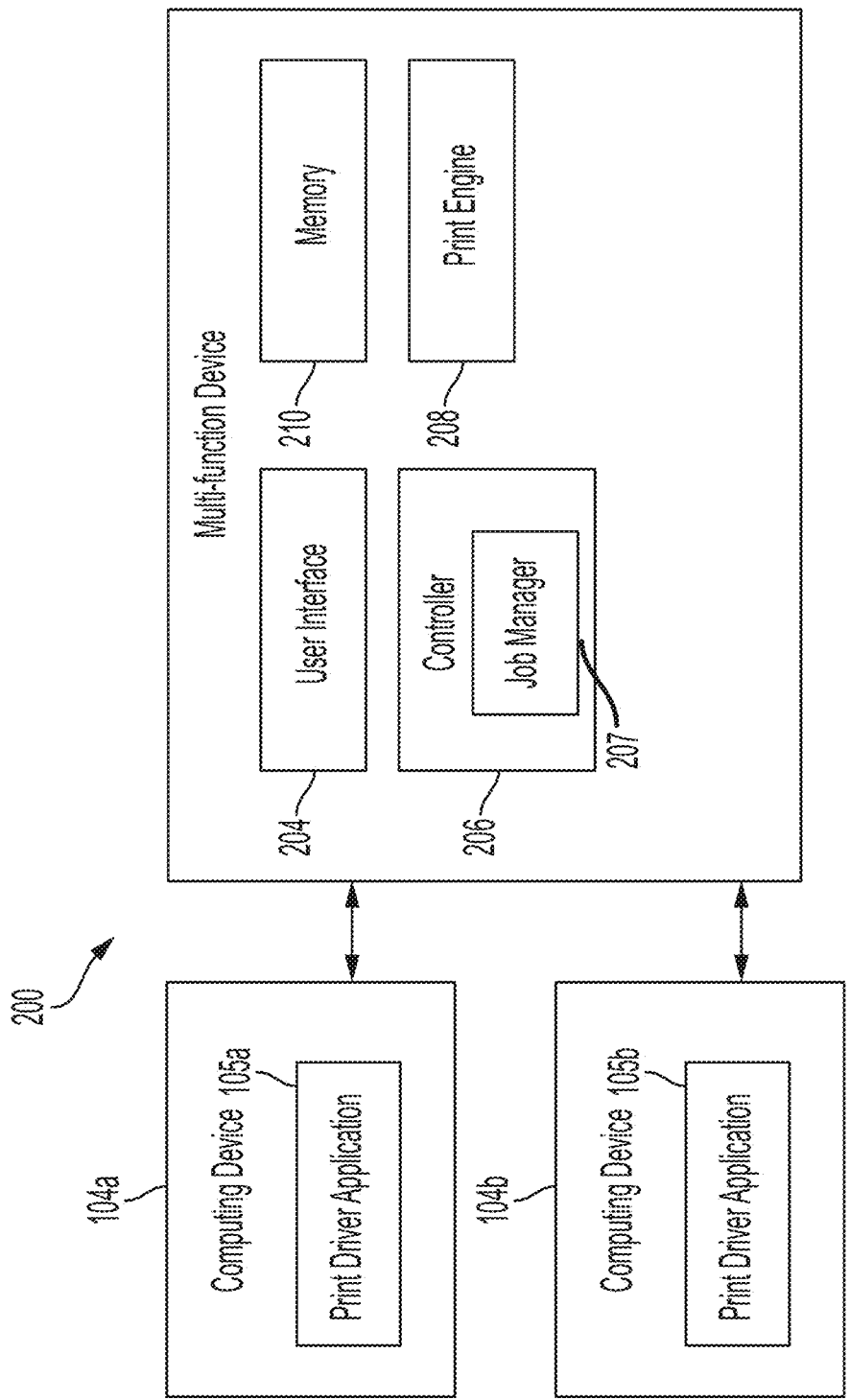
FIG. 2 is a block diagram illustrating various system components of a multi-function device, for implementing the present disclosure.

FIG. 2 is a block diagram of a system 200 for implementing the current disclosure. The system 200 includes a multi-function device 102 and one or more computing devices such as 104a and 104b (collectively 104), communicatively coupled to the multi-function device 102. The computing device 104a includes a print driver application such as 105a and the computing device 104b includes a print driver application 105b. The computing devices 104 are coupled to the multi-function device 102 via a communication network as known or later developed communication network. For example, the communication network may be a wireless network, a wired network, or a combination thereof. The communication network may be implemented as one of the different types of networks such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

As illustrated herein, the multi-function device 102 includes a user interface 204, a controller 206 having a job manager 207, a print engine 208 and a memory 210. The components 204, 206, 207, 208 and 210 are connected to each other via a conventional bus or a later developed protocol. And the components 204, 206, 207, 208 and 210 communicate with each other for performing various functions of the present disclosure. The multi-function device 102 may further include additional component(s) as required to implement the present disclosure. Also, the multi-function device 102 may perform functions and operations as discussed in FIG. 1.

Figure 3A:
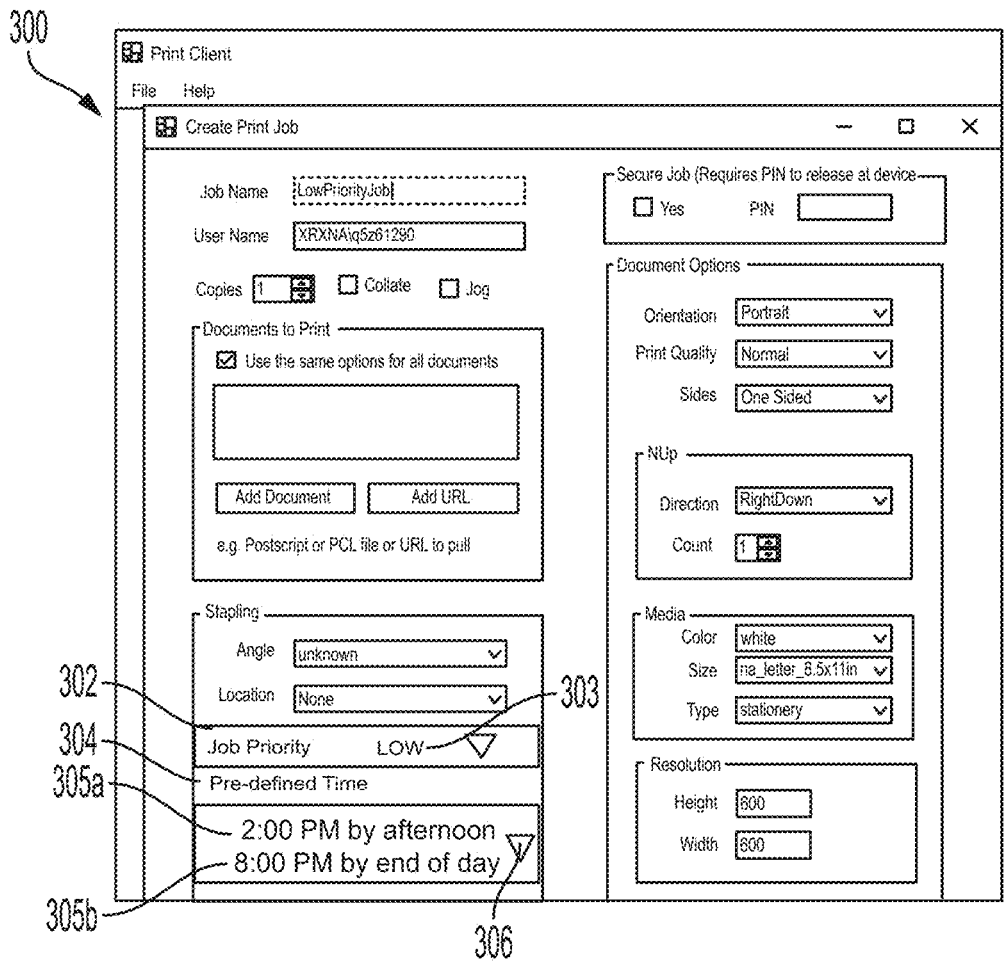

In operation, a user submits a document for printing at the multi-function device 102. The user submits the document for printing using his computing device such as 104a. The computing device 104a runs a print driver application such as 105a that allows the user to submit the document for printing. While submitting, the print driver application 105a allows the user to submit one or more print attributes for printing the document. Various examples of the print attributes may include but not limited to, single sided, double sided, color, orientation, print all pages, print selected pages or the like. In context of the present disclosure, the print driver application 105a includes an option that allows the user to define a priority tag for the document. The priority tag can be a low priority tag, a high priority tag, a regular priority tag or a no priority tag. The user can choose any priority tag based on his requirement. The low priority tag can be selected when the document to be submitted for printing is of low priority i.e., does not need to be printed on immediate basis and/or has sufficient time for printing. The high priority tag can be selected when the document to be submitted for printing is of high priority i.e., needs to be printed on immediate/urgent basis. The regular priority tag can be selected when the document to be submitted for printing is of normal priority i.e., it can be printed as per its order in a job queue at the multi-function device 102. The no priority tag is automatically assigned to the document by the print driver application 105a when the user does not select any priority tag while submitting the document for printing. In some implementations, the no priority tag can be assigned by the multi-function device 102. The print driver application 105a further allows the user to define a completion timeline (pre-defined time) by which the user wants to get his document printed at the multi-function device 102. The completion timeline can be referred to as cut-off time or the maximum time by which document needs to be printed. For example, the cut off time can be End of Day i.e., 8:00 PM, can be 2:00 PM or can be any other time as defined by the user. One exemplary snapshot 300 of the print diver application 105a is shown in FIG. 3A. As illustrated, the print driver application 105a includes an option (marked as 302) named as job priority. The user can select any of the listed options in the job priority option 302. In the snapshot 300, the user selects the low priority tag, marked as 303. The print driver application 105a further includes a pre-defined time marked as 304 (can be referred to as completion time). Under the option 304, multiple sub-options (such as 305a, 305b etc.) are provided, the user can select any of the listed options via a drop-down menu, marked as 306.

Upon receiving all details from the user, the print driver application 105a sends the document, the print attributes, the priority tag such as a low priority tag and predefined time/completion timeline to the multi-function device 102 for further processing i.e., for printing. The document submitted at the multi-function device 102 can be referred to as first job or first print job.

The multi-function device 102 receives the document, the print attributes, the priority tag, and the completion timeline for processing. Specifically, the controller 206 of the multi-function device 102 receives all details and adds the first print job in a print queue at the multi-function device 102. The controller 206 starts executing the first print job at the multi-function device 102 according to the print attributes. Specifically, the controller 206 instructs the print engine 208 to start printing the first job. The first job is required to be completed within a completion time, for example 6:00 PM today.

Scenario 1

While executing the first print job, the controller 206 receives a second job. The second job can be a high priority job, low priority job, normal priority job or a no priority job. In this scenario 1, the second job is considered as a no priority job. The second job can be submitted by the same user or by a different user. While submitting the second job, print attributes, priority tag, completion time are submitted at the multi-function device 102. The controller 206 triggers the job manager 207 to manage multiple priority jobs received for printing i.e., first job and the second job. The job manager 207 runs a pre-defined algorithm to determine an execution order for the first job and the second job. Based on the outcome of the pre-defined algorithm, the controller 206 continues either executing the first job or starts executing the second job.

Specifically, the job manager 207 calculates an estimated completion time for the first job, the estimated completion time refers to the time needed to successfully print the first job. The estimated completion time for the first job can be based on the number of pages in the document, number of pages left to be printed, content type in the document, based on the number of images and textual content in the document or the like. Similarly, the job manager 207 calculates an estimated completion time for the second job. The completion time can be calculated based on the number of pages in the document, number of copies, number of pages to be printed, type of content in the document or the like. It can be considered here that the first print job is a low priority job, and the second job is no priority job. The job 207 manager then compares the estimated completion time for the first print job and the estimated completion time for the second job with the pre-defined time/completion time for the first job. For example, the job manager 207 checks if the sum of the estimated completion time for the first job and the estimated completion time for the second job is less than the pre-defined time, then the second job is executed before the first job. The sum of the estimated completion time for the first job and the estimated completion time for the second job less than the pre-defined time indicates that the first job can still be completed by the pre-defined time, even if the controller 206 accommodates the second job. In such cases, the controller 206 instructs the print engine 208 to pause the first job and starts executing/printing the second job according to its respective print attributes. Once the second job is completed, the controller 206 instructs the print engine 208 to continue printing the first job.

If the job manager 207 finds that the sum of estimated completion time for the first job and the estimated completion time for the second job is greater than the pre-defined time, then the first job is considered before the second job. The sum of the estimated completion time for the first job and the estimated completion time for the second job greater than the pre-defined time indicates that the first job cannot be printed by the pre-defined time if the controller 206 accommodates the second job. In such cases, the controller 206 continues to execute the first job. The print engine 208 continues to print the first job and completes printing the first job. Once the first job is printed successfully, the controller 206 then considers the second job for printing. This way, the controller 206 manages multiple priority jobs received at the multi-function device 102.

For better understanding and discussion purpose, the second job is considered as a no priority job, but the scenario 1 can be implemented for cases where the second job is a low priority job, or a regular priority job.

Scenario 2

In second example, it can be considered that the first job is a low priority job, and the second job is a high priority job. The job manager 207 compares the estimated completion time for the first print job and the estimated completion time for the second job with the pre-defined time. If the job manager 207 finds that the sum of estimated completion time for the first job and the estimated completion time for the second job is less than the pre-defined time, then the second job is executed before the first job. The sum of the estimated completion time for the first job and the estimated completion time for the second job lesser than the pre-defined time indicates that the first job can be printed by the pre-defined time even if the controller 206 or job manager 207 accommodates the second job. In such cases, the controller 206 instructs the print engine 208 to pause the first job and starts executing/printing the second job according to its respective print attributes. Once the second print job is completed, the controller 206 instructs the print engine 208 to continue printing the first job. The print engine 208 then continues printing the first job from where it was left. This way, the job manager 207 manages multiple priority jobs received at the multi-function device 102 such that no large or low priority job (i.e., jobs which are not of high priority but needs to be printed by a specified timeline) can block other jobs such as high priority jobs.

But if the job manager 207 checks that the sum of estimated completion time for the first print job and the estimated completion time for the second job is greater than the pre-defined time, then the second print job is executed before the first job considering the second job is a high priority job. The sum of the estimated completion time for the first job and the estimated completion time for the second job greater than the pre-defined time indicates that the first job cannot be printed by the pre-defined time if the controller 206 accommodates the second print job. But the second job is a high priority job, the job manager 207 considers the second job for printing over the first job at the multi-function device 102. In such cases, the controller 206 instructs the print engine 208 to pause the first job and starts executing/printing the second job according to its respective print attributes. Before printing, the job manager 207 here calculates a new or revised estimated completion time for the first job. The revised/new completion time for the first job can be calculated based on the second job, for example, the number of pages in the document, type of content in the document, number of images in the document corresponding to the second job, or the like. Post calculation, the job manager 207 communicates the new estimated completion time for the first job to the controller 206. The controller 206 further notifies the user of the first print job about the new/revised completion time. The notification can be sent to the user in the form of messages, email, text, or the like. The controller 206 proceeds forward and instructs the print engine 208 to start printing the second job. Here, the print engine 208 pauses printing the first job and starts printing the second job. Once the second job is completed successfully, the controller 206 instructs the print engine 208 to continue printing the first job. The print engine 208 then prints the first job and completes printing both the jobs received at the multi-function device 102. This way, the controller 206 manages the multiple priority jobs at the multi-function device 102.

Figure 3D:
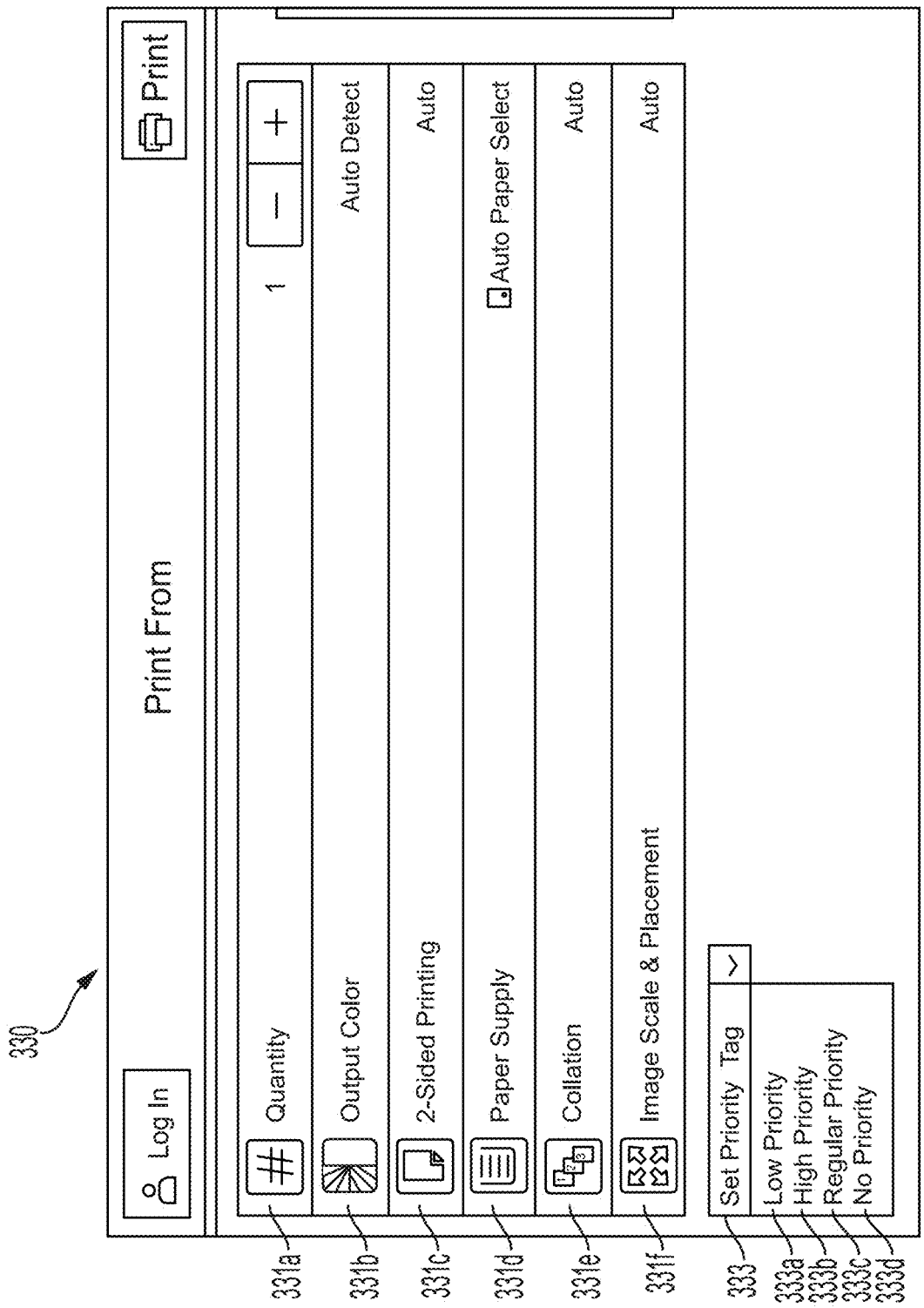

Exemplary notifications such as 312, 322 including messages sent to the user of the first job are shown in snapshots 310 and 320 of FIGS. 3B and 3C respectively. The exemplary notifications are shown to the user via user interface such as 204 of the multi-function device 102. In some implementations, an option for setting a priority tag such as high priority, low priority tag, no priority tag, etc. can be included in the user interface 204 of the multi-function device 102. As clearly show in the snapshot 330 of FIG. 3D, the user interface includes one or more options such as quantity 331*a*, output color 331*b*, 2-sided printing 331*c*, paper supply 331*d*, collation 331*e*, and image scale and placement 331*f*, collectively 331. The options 331 allow the user to select print attributes for printing their respective jobs. In context of the current disclosure, the user interface includes an option such as set a priority tag 333. Under this option 333, multiple options such as low priority tag 333*a*, high priority 333*b*, regular priority tag 333*c*, and no priority tag 333*d* are included. The user can select any of the priority tag basis his requirement and/or organization requirements/policy via drop down options or check box options or other options. The user interfaces shown in FIGS. 3B-3D represent user interface of multi-function device such as 102.

The user interface 204 shows various messages to the user. For example, the message can be: "your document is printed successfully, please collect your document". In another example, the message can be: "paper is jammed, please clear it or contact admin user for the same". The user interface 204 can further be used for providing various inputs at the multi-function device 102. For example, if the user directly selects a document for printing through the multi-function device 102, the user can provide his input such as print attributes via the user interface 204. The user interface 204 is a local user interface, LUI, which can be additional device such as tablet attached to the multi-function device 102. In other cases, the user interface 204 can be an in-built touch screen or screen with manual buttons. These are few examples, but any kind of user interface as known or later developed can be used. The memory 210 stores all relevant information required for implementing the current disclosure. For example, the memory 210 temporarily stores the first job, second job, their respective print attributes, estimated completion time for the first job and the second job, pre-defined time, user details or the like. Any details stored in the memory 210 may be retrieved by the controller 206, job manager 207 or other components of the multi-function device 102 for implementing the current disclosure.

Exemplary Flowcharts

Figure 4:
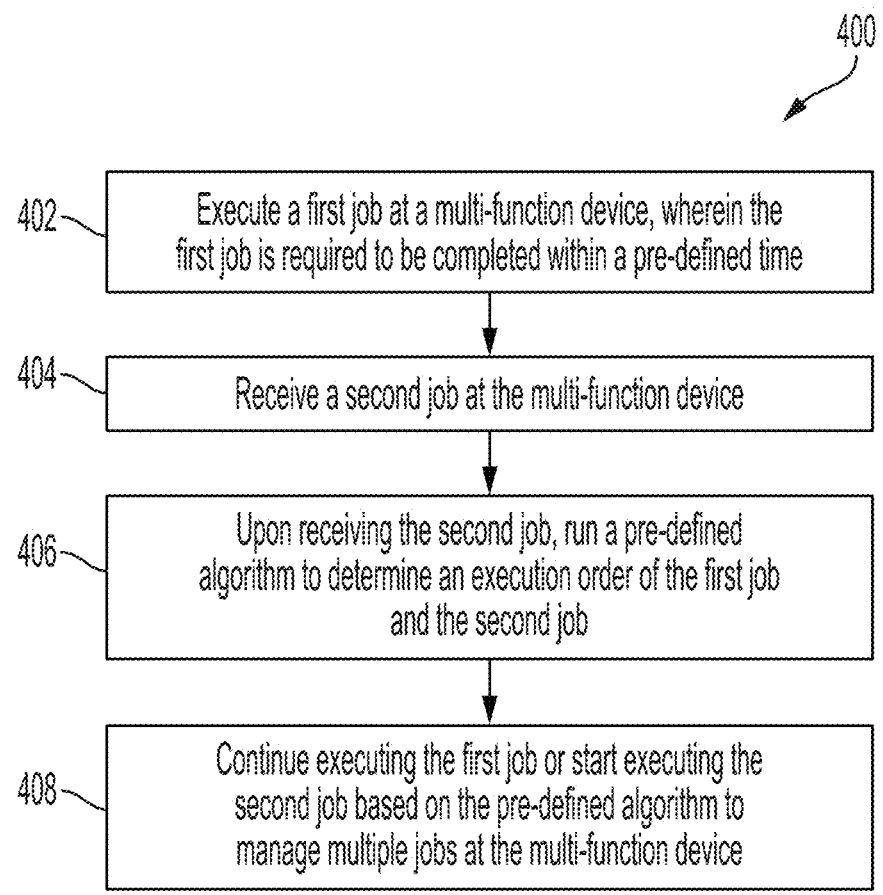
FIG. 4 is a flow chart for managing multiple priority jobs at a multi-function device.

FIG. 4 is a method flowchart 400 for managing multiple priority jobs received at a multi-function device. The method 400 can be implemented at a multi-function device such as 102, or any equivalent device with printing capabilities.

The method 400 begins when a user wishes to print a document that is a huge document. The user submits the document for printing at the multi-function device. Along with this, the user submits one or more print attributes required for printing the document. The user can submit the document for printing via any computing device such as 104a, 104b, or so on. Specifically, the user submits the document for printing via print application such as 105a, or 105b. Alternatively, the user can submit the document for printing via any other print submission facilities such as a cloud location, a network location, or the like. In cases where the document is submitted via cloud location, network location or other such options, a user interface for submitting the print job includes an option that allows the user to set a priority for the print job. By default, the priority for such jobs can be set as low priority. The user interface further includes an option that allows the user to set a pre-defined time. In context of the current disclosure, the print driver application includes a priority tag option for user's selection/input. The priority tag option allows the user to define a priority for the document. The print driver application further allows the user to define/input a pre-defined time for printing the document. Once received, the print driver application receives the document, the print attributes, the priority tag, the pre-defined time from the user and sends the details to the multi-function device for further processing. The document for printing here refers to a first job.

In implementation, the first print job is received at the multi-function device. It can be considered that the first job is a job including large number of pages to be printed and hence the user assigns it as a low priority tag. Further, it can be considered that the user wants his document to be printed within a pre-defined time i.e., by end of day such as 9:00 PM. At 402, the first job is executed at the multi-function device, the first job is to be completed within the pre-defined time. Then, at 404, a second job is received at the multi-function device. The second job can have a low priority tag, a regular priority tag, a high priority tag or may have no priority tag. Upon receiving the second job, at 406, a pre-defined algorithm is run to determine an execution order of the first job and the second job. At 408, one of the following is performed: either the execution of the first job continues, or the execution of the second job is started. For example, based on the outcome of the pre-defined algorithm, either printing of the first job is continued or printing of the second job is started at the multi-function device. The method 400 additionally includes calculating estimated completion time for the first job and an estimated completion time for the second job. The pre-defined algorithm includes comparing the estimated completion time for the first job and the estimated completion time for the second job with the pre-defined time. Based on the comparison and the priority tag of the second job, either the first job is continued to be printed at the multi-function device or execution of the second job is started at the multi-function device. This way, the method 400 manages multiple priority jobs at the multi-function device. More details will be discussed in FIGS. 5 and/or 6.

The pre-defined algorithm is based on the estimated completion time (ETC) for the first job and second job, pre-defined time for the first job and priority tags of respective jobs. For example:

If ETC for first job+ETC for second job<=pre-defined time, then execute the second job, where the first job is a low priority job and the second job can be one of: a low priority job, regular priority job, no priority job.

If ETC for first job+ETC for second job>=pre-defined time, then execute the first job, where the first job is a low priority job and the second job can be one of: a low priority job, regular priority job, no priority job.

If ETC for first job+ETC for second job<=pre-defined time, then execute the second job, where the first job is a low priority job and the second job can be a high priority job.

If ETC for first job+ETC for second job>=pre-defined time, then execute the second job, where the first job is a low priority job and the second job can be a high priority job.

For easy understanding, an example is discussed, where first job is a low priority job, and second job is a no priority job. It can be considered that the estimated completion time for first job is 15 minutes and estimated completion time for second job is 25 minutes and the pre-defined time for the first job is within 3 hours from submission. Then, 25+15=40 minutes are compared with the pre-defined time here i.e., 180 minutes (3 hours). Here, ETC for first job+ETC for second job<pre-defined time, hence the second is considered for printing over the ongoing first job. So here the execution order is second job and then remaining first job.

In another example, first job is a low priority job, and second job is a high priority job. It can be considered that the estimated completion time for first job is 2 hours and estimated completion time for second is 15 minutes and the pre-defined time for the first job is by End of Day i.e., 8:00 PM today. Then, 120+15=135 minutes are compared with the pre-defined time here i.e., End of Day. Here, an additional check is performed. In this additional check, difference between current time and end of day is considered. For example, if the current time is 4:00 PM and the end of day is 8:00 PM. So, the difference is 4 hours i.e., 240 minutes. So here 135 minutes<240 minutes, hence the second job is considered for printing over the ongoing first job. So here the execution order is printing the second job and then printing the remaining first job.

For easy understanding, first job is taken as a low priority job, but the disclosure is applicable to any job that is large or huge in size or jobs that have some buffer time or sufficient time for printing.

The present disclosure allows the user to input pre-defined time in cases where the print job is a low priority job. In cases the user inputs the pre-defined time for the second job, it is considered that the second job is a low priority job. In such cases, the first job and the second job are considered with equal priority and are printed in accordance with first come first serve basis. In some cases, where the user provides pre-defined time for the second job within which both jobs cannot be completed, the second job is not accepted for execution with the pre-defined time for the second job. In such cases, a notification can be provided to the user. An exemplary prompt or notification can be "since an equal priority large job is in place, your job cannot be completed by the time specified, this is the new estimated time of completion, please confirm to proceed or cancel". Based on user input, the second job is considered for execution, i.e., printing. For example, if the user confirms the new estimated time, the second job is printed. If the user cancels the job, the second job is not considered for printing.

The disclosure is discussed wrt scenarios where the first job is a low priority job, and the second job can be a high priority job/regular priority job/no priority job. But the disclosure can be implemented for scenarios where the first job is priority is high priority job/regular priority job/no priority job and the second job is a low priority job with a pre-defined time. In such implementations, the first job is printed first, and the second job is printed thereafter. Also, the multi-function device such as 102 checks if both the jobs can be printed within the pre-defined time. If yes, the multi-function device accepts the second job for printing. Otherwise, the second job is not accepted for execution with the pre-defined time for the second job. In such cases, a notification can be provided to the user. An exemplary prompt or notification can be "since an equal priority large job is in place, your job cannot be completed by the time specified, this is the new estimated time of completion, please confirm to proceed or cancel". Based on user input, the second job is considered for execution, i.e., printing. For example, if the user confirms the new estimated time, the second job is printed. If the user cancels the job, the second job is not considered for printing.

Figure 5:
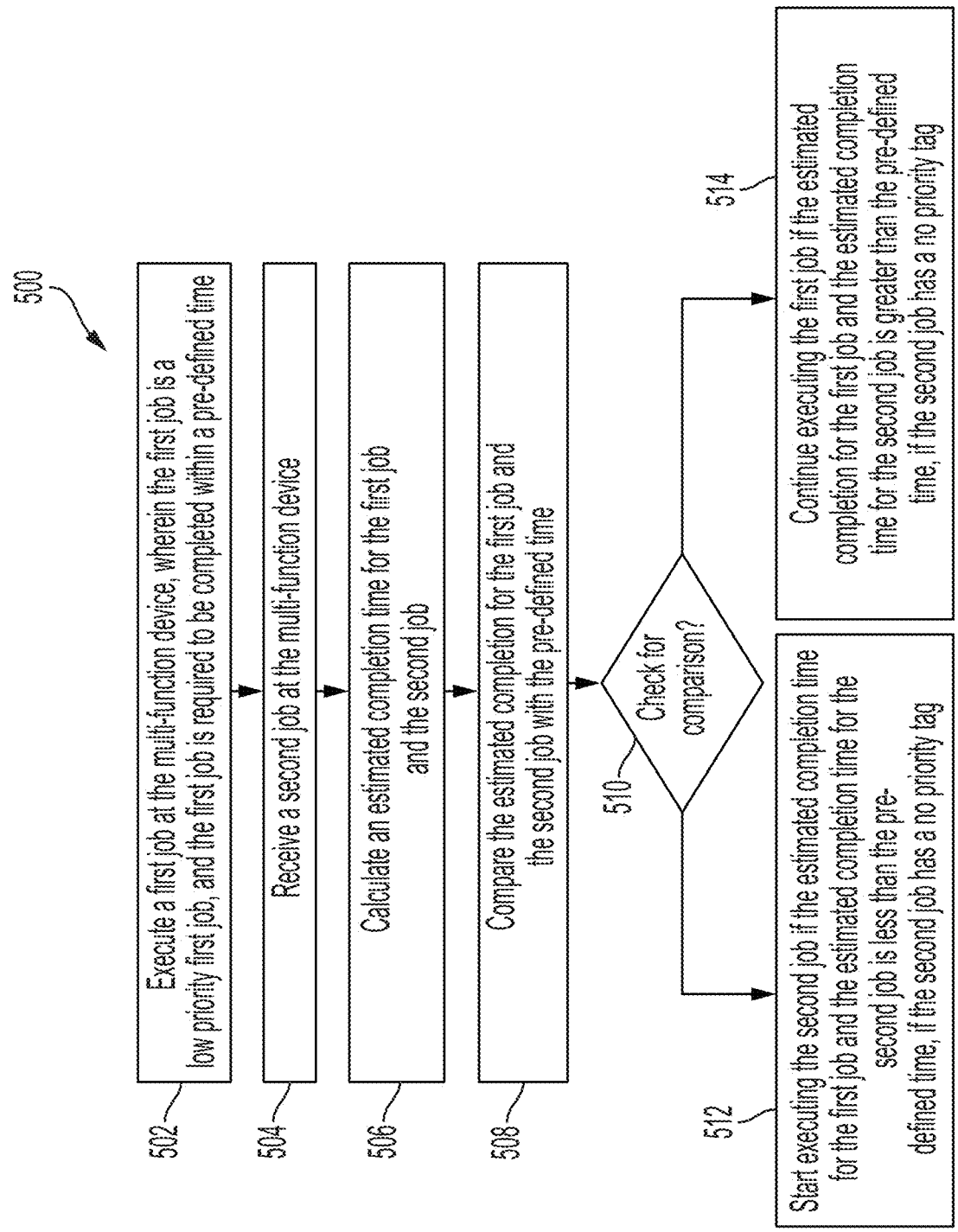
FIG. 5 represents a flow chart for managing multiple priority jobs at the multi-function device, describing a scenario, where a first print job has a low priority tag, and a second print job has no priority tag.

FIG. 5 is a method flowchart 500 for managing multiple priority jobs at a multi-function device, where a first job is a low priority job and a second print job is one of: a no priority job, a regular priority job, or a low priority job. The method 500 can be implemented at a multi-function device or an equivalent device with printing capabilities.

The method 500 begins when a user submits a first job at the multi-function device along with print attributes. In context of the present disclosure, the user submits a pre-defined time and a priority tag such as a low priority tag. At 502, the execution of the first job starts at the multi-function device, here the first job is a low priority job, and the job is required to be completed within the pre-defined time. Then at 504, a second job is received at the multi-function device. The second job is a no priority job. Also, the second job is received after the first job. Upon receiving the second job, a pre-defined algorithm is run to determine an execution order for the first job and the second job. The second job can be submitted by a different user or may be submitted by the same user who submitted the first job. For example, at 506, an estimated completion time for the first job and an estimated completion time for the second job are calculated. Then, at 508, the estimated completion time for the first job and the second job are compared with the pre-defined time for the first job. Based on the comparison, either the execution of the first print job continues, or the execution of the second job starts. At 510, comparison is checked. At 512, the execution of the second job is started if the estimated completion time for the first job and the estimated completion time for the second job is less than the pre-defined time. Here the first job is put on hold till completion of the second job. Once the second job is completed/printed successfully, the method 500 resumes printing the first job. The method 500 continues to print the first job till completion.

Looping back to the comparison check, at 514, the execution of the first job is continued if the estimated completion for the first job and the estimated completion time for the second job is greater than the pre-defined time. This way the method 500 manages multiple priority jobs having the same/similar priority tag or multiple jobs belong to the same priority group (low priority tag and low priority tag; low priority tag and regular priority tag; low priority tag and no priority tag).

Figure 6:
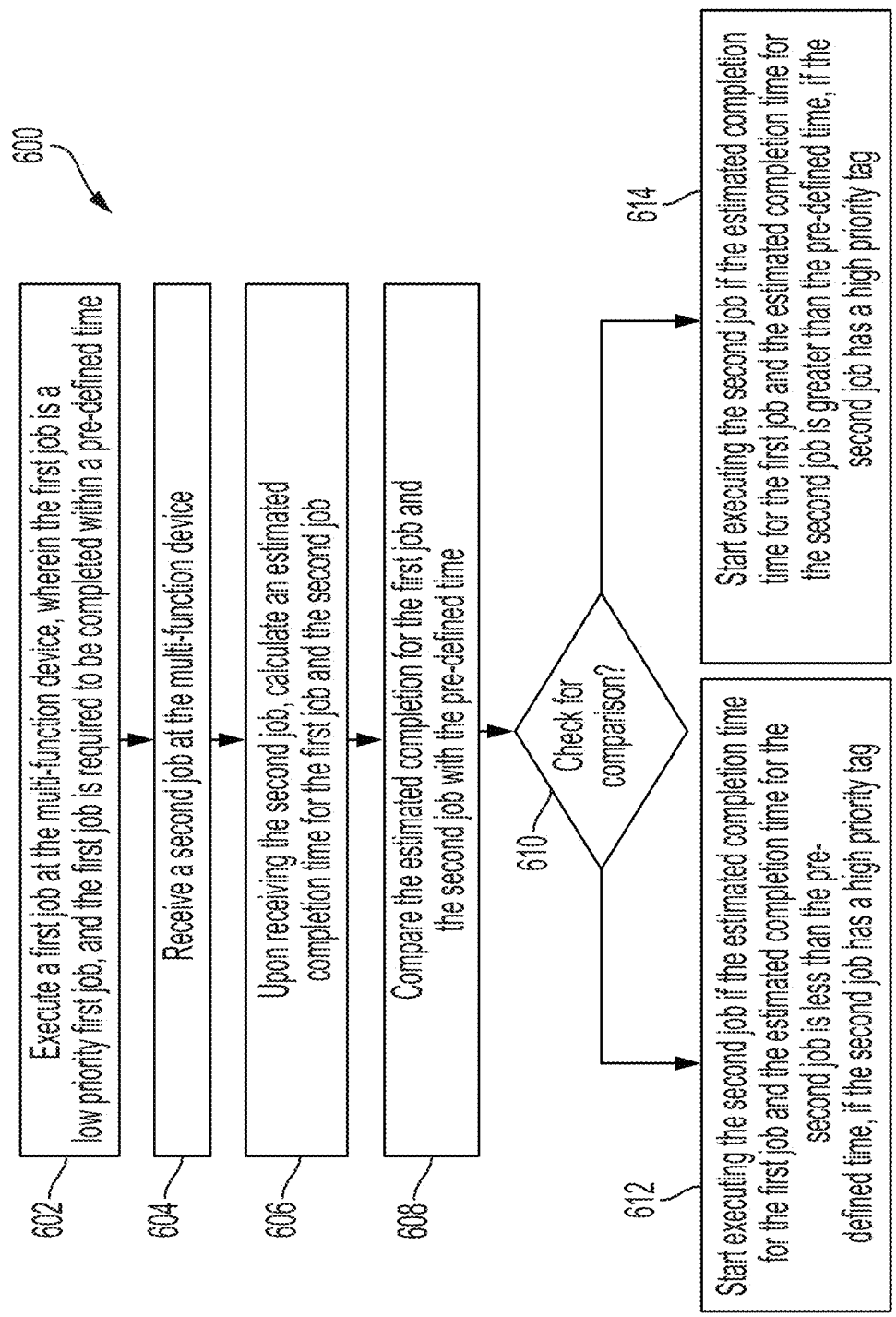
FIG. 6 represents a flow chart for managing multiple priority jobs at the multi-function device, describing a scenario, where a first print job has a low priority tag, and a second print job has a high priority tag.

FIG. 6 is a method flowchart for managing multiple priority jobs at a multi-function device, where a first print job is a low priority job, and a second print job is a high priority job. The method 600 can be implemented at a multi-function device or an equivalent device with printing capabilities The method 600 begins when a user submits a first job at the multi-function device along with print attributes. In context of the present disclosure, the user submits a first job along with a pre-defined time and a priority tag such as a low priority tag. At 602, the execution of the first job starts at the multi-function device, here the first job is a low priority job, and the job is required to be completed within the pre-defined time. Then at 604, a second job is received at the multi-function device. Upon receiving the second job, a priority tag of the second job is checked. Then, a pre-defined algorithm is run to determine an execution order for the first job and the second job. The second job can be submitted by a different user or may be submitted by the same user who submitted the first job. At 606, an estimated completion time for the first job and an estimated completion time for the second job are calculated. Then, at 608, the estimated completion time for the first job and the second job are compared with the pre-defined time for the first job. Based on the comparison, the execution of the second job starts. At 610, comparison is checked. At 612, the execution of the second job starts if the estimated completion time for the first job and the estimated completion time for the second job is less than the pre-defined time. Else at 614, the execution of the second job starts if the estimated completion for the first job and the estimated completion time for the second job is greater than the pre-defined time. In such cases, the method 600 includes calculating a new estimated completion time for the first job. Once calculated, the new estimated completion time is notified to the user of the first job. The notification can be sent to the user via one or more ways such as email, text, message, whatsapp or the like. These are few examples but other forms of notification as known or later developed can be implemented.

The user receives the notification. The user can provide his input on the new estimated completion time for the first job. Based on his input, the method 600 proceeds forward. For example, if the user is OK with the new estimated completion time, the method 600 starts executing/printing the second job. Once the second job is completed, the method 600 resumes printing the first job from it was left. For example, if 30 pages of the first job having 50 pages got printed, the method 600 resumes printing from 31st page and continues printing the first job till completion. But, if the user is NOT Ok with the new estimated completion time, the user can withdraw his first job from execution at the multi-function device. This way the method 600 manages multiple priority jobs having different priority tags (low priority tag and high priority tag).

The methods 400, 500 and 600 can be implemented in the form of non-transitory computer-readable medium storing instructions, which when executed by one or more processors cause the one or more processors to implement the method blocks as discussed in respective methods.

According to the present disclosure, the user provides the pre-defined time and the priority tag for the first job to be submitted at the multi-function device. For example, if the first job is a low priority job, the user provides the low priority tag and further inputs the pre-defined time by which first job is to be completed. Similarly, user of the second job provides any or both the pre-defined time and the priority tag. For example, if the second job is a high priority job, then the user provides the high priority tag. If the second job is a low priority tag, the user provides the low priority tag and further inputs the pre-defined time by which the second job is to be completed.

The present disclosure is discussed where the first job is a low priority job, but the disclosure can be implemented where the first job is a normal priority job, no priority job. Here the second job can be any of the low priority job, no priority job, normal priority job or high priority job.

The present disclosure includes the option of setting priority tags and/or pre-defined time in user interface of print driver applications and/or in the user interface of multi-function devices.

The present disclosure discloses methods and systems for managing multiple priority jobs at a multi-function device. The methods and systems manage multiple priority jobs such that low priority, large jobs, or jobs that have sufficient time to print cannot block multi-function device for printing other jobs. The methods and systems manage multiple priority jobs such that first job and second job can be printed as required by respective users without making any user wait for printed documents.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, pausing, continuing, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for managing multiple jobs at a multi-function device, the method comprising:
executing a first job at the multi-function device, wherein the first job is required to be completed within a pre-defined time, wherein the first job has one of: a no priority tag, a low priority tag, or a normal priority tag;
receiving a second job at the multi-function device, wherein the second job has one of: a no priority tag, a low priority tag, a normal priority tag or a high priority tag;
upon receiving the second job, estimating a completion time for the first job and the second job;
comparing a sum of the estimated completion time for the first job and the estimated completion time for the second job with the pre-defined time; and
based on the comparison, either continuing executing the first job or start executing the second job.

2. The method of claim 1, further comprising, checking for a priority tag for the second job.

3. The method of claim 1, further comprising, start executing the second job if the estimated completion time for the first job and the estimated completion time for the second job is less than the pre-defined time, if the second job has one of: a no priority tag, a low priority tag, or a normal priority tag.

4. The method of claim 1, further comprising, continue executing the first job if the estimated completion for the first job and the estimated completion time for the second job is greater than the pre-defined time, if the second job has one of: a no priority tag, a low priority tag, or a normal priority tag.

5. The method of claim 1, further comprising, start executing the second job if the estimated completion time for the first job and the estimated completion time for the second job is less than the pre-defined time, if the second job has a high priority tag.

6. The method of claim 1, further comprising, start executing the second job if the estimated completion time for the first job and the estimated completion time for the second job is greater than the pre-defined time, if the second job has a high priority tag.

7. The method of claim 5 or 6, further comprising, calculating a new estimated completion time for the first job.

8. The method of claim 7, further comprising, notifying a user of the first job about the new estimated completion time for the first job.

9. The method of claim 1, wherein the pre-defined time is the time by which the first job needs to be printed.

10. The method of claim 1, further comprising, allowing a user of the first job to provide the pre-defined time and the priority tag for the first job before submitting the first job at the multi-function device.

11. The method of claim 1, further comprising, allowing a user of the second job to provide any or both of: a pre-defined time and the priority tag for the second job before submitting the second job at the multi-function device.

12. A multi-function device for managing multiple jobs received at the multi-function device, the multi-function device comprising:
a controller for:
executing a first job at the multi-function device, wherein the first job is required to be completed within a pre-defined time, wherein the first job has one of: a no priority tag, a low priority tag, or a normal priority tag;
receiving a second job at the multi-function device, wherein the second job has one of: a no priority tag, a low priority tag, a normal priority tag or a high priority tag;
upon receiving the second job, estimating a completion time for first job and the second job;
comparing a sum of the estimated completion time for the first job and the estimated completion time for the second job with the pre-defined time; and
based on the comparison, continuing executing the first job or start executing the second job.

13. The multi-function device of claim 12, wherein the controller starts executing the second job if the estimated completion time for the first job and the estimated completion time for the second job is less than the pre-defined time, if the second job has one of: a no priority tag, a low priority tag, or a normal priority tag.

14. The multi-function device of claim 12, wherein the controller continues executing the first job if the estimated completion for the first job and the estimated completion time for the second job is greater than the pre-defined time, if the second job has one of: a no priority tag, a low priority tag, or a normal priority tag.

15. The multi-function device of claim 12, wherein the controller starts executing the second job if the estimated completion time for the first job and the estimated completion time for the second job is less than the pre-defined time, if the second job has a high priority tag.

16. The multi-function device of claim 12, wherein the controller starts executing the second job if the estimated completion time for the first job and the estimated completion time for the second job is greater than the pre-defined time, if the second job has a high priority tag.

17. The multi-function device of claim 16, wherein the controller calculates a new estimated completion time for the first job.

18. The multi-function device of claim 17, wherein the controller notifies a user of the first job, about the new estimated completion time for further action.

19. A method for managing multiple priority jobs at a multi-function device, the method comprising:
executing a first job at the multi-function device, wherein the first job has one of: a low priority tag, a normal priority tag, or a no priority tag, and the first job is required to be completed within a pre-defined time;
receiving a second job at the multi-function device, wherein the second job has one of: a no priority tag, a low priority tag, or a normal priority tag;

upon receiving the second job, running a pre-defined algorithm to determine an execution order for the first job and the second job;

calculating an estimated completion time for the first job and the second job; and performing one of the following:

start executing the second job if a sum of the estimated completion time for the first job and the estimated completion time for the second job is less than the pre-defined time; and continue executing the first job if a sum of the estimated completion for the first job and the estimated completion time for the second job is greater than the pre-defined time.

20. The method of claim 19, further comprising, pausing the first job.

21. A method for managing multiple priority jobs at a multi-function device, the method comprising:

executing a first job at the multi-function device, wherein the first job has one of: a low priority tag, a normal priority tag, or a no priority tag, and the first job is required to be completed within a pre-defined time;

receiving a second job at the multi-function device, wherein the second job has a high priority tag;

upon receiving the second job, running a pre-defined algorithm to determine an execution order of the first job and the second job;

calculating an estimated completion time for the first job and the second job; and performing one of the following:

start executing the second job if a sum of the estimated completion time for the first job and the estimated completion time for the second job is less than the pre-defined time; and start executing the second job if a sum of the estimated completion time for the first job and the estimated completion time for the second job is greater than the pre-defined time.

22. The method of claim 21, further comprising, calculating a new estimated completion time for the first job, if the estimated completion time for the first job and the estimated completion time for the second job is greater than the pre-defined time.

23. A system for managing multiple priority jobs, the system comprising:

one or more computing devices, wherein each computing device comprises a print driver application, wherein the print driver application comprises an option to define a priority tag for one or more jobs to be submitted at a multi-function device, and the print driver application further comprises an option that allows one or more users to define a pre-defined time for each job to be submitted at the multi-function device, wherein the one or more computing devices are for:

sending a first job for printing at the multi-function device along with a pre-defined time and a priority tag, wherein the first job has one of: a no priority tag, a low priority tag, or a normal priority tag; and sending a second job for printing at the multi-function device and a priority tag, wherein the second job has one of: a no priority tag, a low priority tag, a normal priority tag or a high priority; and a multi-function device communicatively coupled to the one or more computing devices, for:

executing the first job at the multi-function device, wherein the first job is required to be completed within the pre-defined time;

receiving the second job at the multi-function device;

upon receiving the second job, estimating a completion time for the first job and the second job;

comparing a sum of the estimated completion time for the first job and the estimated completion time for the second job with the pre-defined time; and based on the comparison, continuing executing the first job or start executing the second job.

24. The system of claim 23, wherein the multi-function device starts executing the second job if the estimated completion time for the first job and the estimated completion time for the second job is less than the pre-defined time and, if the second job has one of: a no priority tag, a low priority tag, or a normal priority tag.

25. The system of claim 23, wherein the multi-function device continues executing the first job if the estimated completion for the first job and the estimated completion time for the second job is greater than the pre-defined time and, if the second job has one of: a no priority tag, a low priority tag, or a normal priority tag.

26. The system of claim 23, wherein the multi-function device starts executing the second job if the estimated completion time for the first job and the estimated completion time for the second job is less than the pre-defined time and, if the second job has a high priority tag.

27. The system of claim 23, wherein the multi-function device starts executing the second job if the estimated completion time for the first job and the estimated completion time for the second job is greater than the pre-defined time and, if the second job has a high priority tag.

28. The system of claim 27, wherein the multi-function device calculates a new estimated completion time for the first job, if the estimated completion time for the first job and the estimated completion time for the second job is greater than the pre-defined time and, if the second job has a high priority tag.

* * * * *